Jan. 31, 1956     T. ANDREWS     2,733,136
APPARATUS FOR THE EXTRACTION OF OILS FROM VEGETABLE MATTER
Original Filed Oct. 18, 1949
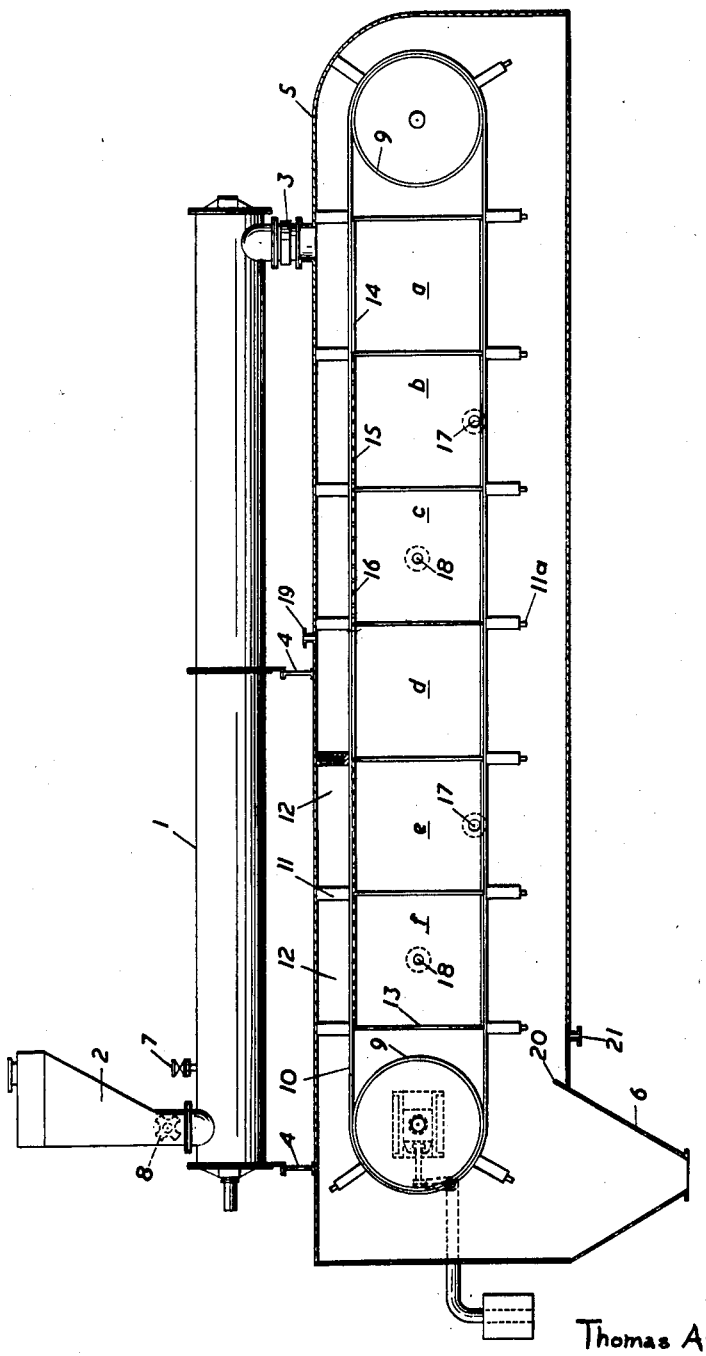
Thomas Andrews
Inventor
By
John James Victor Armstrong
Attorney

United States Patent Office 2,733,136
Patented Jan. 31, 1956

2,733,136

APPARATUS FOR THE EXTRACTION OF OILS FROM VEGETABLE MATTER

Thomas Andrews, Driffield, England, assignor to Rose, Downs & Thompson, Kingston-upon-Hull, England, a British company Original application October 18, 1949, Serial No. 121,934. Divided and this application February 3, 1953, Serial No. 334,847

Claims priority, application Great Britain November 1, 1948

3 Claims. (Cl. 23—270)

This invention relates to an apparatus for extracting oils from vegetable matter such as seeds, beans and nuts. This application is a divisional application of Serial No. 121,934, now abandoned.

The grinding of materials such as seeds, beans and nuts which is necessary before the solvent extraction of the oils contained therein can be effected produces a proportion of "fines" which at present causes difficulty in extracting satisfactorily the oil from the solid ground material. Moreover, in the case of those nuts and seeds containing a fine starchy or albuminous solid base in combination with a high oil content grinding may produce a pasty mass through which the extraction solvent penetrates only with difficulty and the economic extraction of the material may be seriously retarded or even prevented. In order to overcome this latter defect it has been found necessary to prepare nuts and seeds of this type prior to the solvent extraction in such a manner that flakes are provided capable of retaining their shape and yet at the same time being thin enough to be readily penetrated by the solvent. Seeds such as typified by the ground nut do not readily lend themselves to such treatment and it has been found necessary to devise a preparation plant which is often more costly in itself and more costly in operation than is the actual extraction plant and its operation.

An object of the present invention is to provide an apparatus for extracting oils from vegetable material such as seeds and nuts wherein the process of extraction is carried out continuously and economically irrespective of the type of seed being treated. A further object is to provide an apparatus for extracting oils from seeds and nuts in which the oils can be economically extracted without regard being paid to the presence of a large proportion of "fines."

Apparatus for extracting oils from vegetable matter such as seeds, nuts and beans comprises an enclosing casing having an entry port for slurry and an exit port for spent meal, a compartment disposed within said casing and partitioned into a plurality of chambers with a selected number of such chambers having each a perforated top and having means associated with such selected chambers for establishing differences of pressure in successive chambers, and a series of contiguous receptacles having bottoms formed of a porous or reticulated material constituting a continuous belt conveyor arranged so as to travel in close proximity to the top of the compartment. Those chambers of the partitioned compartment having a perforate or reticulate top are provided with means either for exhausting the section or developing a positive pressure therein.

In a preferred embodiment of the invention, a neutral chamber is disposed between any two pairs of vacuum/pressure sections over the top of which chamber the differential pressures previously created in the preceding vacuum/pressure chambers of the compartment are allowed to equalise themselves. Any such neutral chamber has a solid top.

The contiguous slurry-carrying receptacles may conveniently be mounted upon a continuous porous belt conveyor which is carried upon drums or rollers disposed at each end of an elongated enclosing casing. The belt conveyor may conveniently be arranged to circumscribe the partitioned compartment. The belt conveyor may be of a width substantially equal to that of the elongated casing and may be provided with a plurality of upstanding plates which bear resiliently against the sides and top of the casing, thus providing a series of contiguous compartments which are substantially slurry-tight but which are not tight to the atmosphere prevailing within the enclosed casing and which utilise the sides of the enclosed casing as the side walls of the contiguous compartments.

The slurry may be made from pulverised seed and a clean solvent, or from pulverised seed and a partially used miscella.

The invention will now be more particularly described by reference to the accompanying drawing which represents a diagrammatic representation, partly in section, of one specific embodiment of the invention.

An elongated enclosed vapour-tight trough 1 having a feed hopper 2 at one end and an oppositely directed discharge pipe 3 at its other end, providing an entry port into an enclosing casing 5, is braced as at 4 to lie substantially parallel to and above the top of the elongated enclosing casing 5, having a discharge hopper 6 providing an exit port for exhausted or spent meal at its end substantially beneath the feed hopper 2 of the trough 1. A throttle-controlled inlet pipe 7 for solvent is disposed near the feed hopper 2. Communication between the feed hopper and the trough is controlled by a vapour-tight rotary valve 8. The enclosing casing 5 contains a roller or drum 9 adjacent to each of its ends one of which is adapted to be power driven and this pair of rollers or drums carries a continuous belt conveyor 10 of porous or reticulated material which is kept taut by means of any suitable tensioning means (not shown). The width of the continuous belt 10 is substantially the same as that of the enclosing casing within which it moves. A series of interspaced division plates 11 conveniently comprising a spring loaded shutter 11a and which are substantially impervious to attack by solvent, oil or miscella, project outwardly at right angles from the continuous belt and bear resiliently against the sides and upper surface of the enclosed casing, thus constituting, in conjunction with the sides and top of the casing and the belt, a series of contiguous receptacles 12. A partitioned compartment 13 lies axially within the enclosed casing 5 between the top and bottom webs of the continuous belt and is of a length to occupy substantially the whole of the distance between the drums or rollers 9. This partitioned compartment 13 contains six separate contiguous chambers a-f. Section a of the partitioned compartment has a solid top 14 whereas chambers b and c have perforated or reticulated tops 15 and 16 lying in immediate contact with the continuous porous belt. Tops 14, 15 and 16 form a fixed platform parallel to the top surface of casing 5. Sections d, e and f reproduce chambers a, b and c respectively. Vacuum chambers b and e are provided with means for producing a vacuum therein (diagrammatically indicated at 17) and pressure chambers c and f with means for developing a pressure therein (diagrammatically indicated at 18). An inlet pipe 19 providing an entry port for fresh solvent or miscella is provided in the top of the enclosed casing immediately above chamber d. The discharge hopper 6 has a lip 20 extending across the width of the enclosed casing to prevent any slurry which may have leaked out of the charged contiguous receptacles on the continuous porous belt into the bottom of the enclosed casing from passing into the hopper and thus contaminating the exhausted meal. A separate discharge pipe 21 is provided in the bottom of the enclosed casing for removal of any such slurry.

The mode of operation of the apparatus is as follows: Suitable pulverised seed or other oily material is supplied to the feed hopper 2 from which it passes into the vapour-tight trough 1 through the rotary valve 8. Solvent or miscella is introduced into the trough through the throttle-controlled inlet pipe 7 and the pulverised seed plus solvent or miscella then passes from the hopper to the discharge end of the trough being assisted in its passage by a paddle form of conveyor blades (not shown) working between beater-arms (not shown) within the trough which together create a consistent slurry of the pulverised seed and solvent/miscella. This slurry then falls by gravity through the discharge pipe 3 and proceeds to fill one of the series of contiguous receptacles 12 on the continuous porous belt 10 disposed immediately beneath the discharge pipe 3 and lying above chamber $a$ of the partitioned compartment 13. With the movement of the belt receptacle 12 charged with slurry passes progressively from its position immediately above chamber $a$ of the partitioned compartment to a position above chamber $b$ of the partitioned compartment in which latter chamber $a$ vacuum obtains. By virtue of this vacuum the fluid content of the slurry is induced to pass through the porous belt and perforated top 15 of the chamber $b$ into the said section from whence it can be recovered. This removal of fluid is progressive as the slurry-charged receptacle moves across the perforations in the top of chamber $b$. The movement of the continuous porous belt is controlled so that the maximum drainage is effected whilst each contiguous receptacle 12 passes completely over chamber $b$. Under the influence of the vacuum there will be a tendency for the solids in the slurry to pack together and such packing or caking obviously retards or even prohibits extraction. As the contiguous receptacle and its content of now partially exhausted meal passes progressively across the top of chamber $c$ of the partitioned compartment the conditions are reversed because a positive pressure obtains in this chamber. The pressure obtaining in chamber $c$ causes the aggregated meal to be broken up and the finely divided material will tend to open out. Progressive movement of the continuous porous belt brings the contiguous receptacle into a neutral position corresponding to chamber $d$ at which stage further solvent or miscella is introduced into the contiguous receptacle through the inlet port 19. The opened-out meal is thus brought into contact with the requisite clean solvent or miscella and further extraction of oils takes place, the application of differential pressures as between adjacent chambers of the partitioned compartment being repeated in chambers $e$ and $f$.

It will be appreciated that the disposition of sections in the partitioned compartment corresponding to neutral, reduced and enhanced pressure zones may be repeated to order dependent upon the number of solvent washes deemed necessary to exhaust the meal.

After passing chamber $f$ the continuous belt 10 carrying a receptacle 12 with its content of now extracted or spent meal passes over the supporting drum 9 and the receptacle 12 then becomes inverted with the result that the finely divided meal which has been opened out and blown from close contact with the continuous porous belt whilst passing progressively across chamber $f$ falls by gravity into the discharge hopper 6 from whence it can be removed, if desired, to a plant of conventional type wherein the solvent saturated meal can be treated to yield a dry meal and a proportion of solvent recovered.

Various detail modifications may be introduced into the apparatus. For example, if desired, the temperature of the slurry in the enclosed trough can be raised by suitable jacketing of the trough to enhance rate and extent of extraction. Again, it is found convenient to utilise the air withdrawn from chambers $b$ and $e$, i. e. the vacuum sections, as a contribution to the positive pressure obtaining in chambers $c$ and $f$.

It will thus be seen that by subjecting vegetable matter containing oils, as exemplified by seeds, nuts or beans, to pulverisation and then intimately mixing the pulverised material with an extraction solvent to form a slurry and thereafter subjecting this slurry in the apparatus of the present invention to repeated filtration, agitation and rewashing under conditions of differential pressure, it is possible to achieve a satisfactory and economic extraction of oils from seeds, nuts and beans without having to subject the raw material to specialised and costly initial treatments.

I claim:

1. Apparatus for extracting oils from vegetable matter and comprising in combination, an enclosing casing, a fixed platform mounted below and parallel to the top surface of said casing and consisting of a first section which is solid, a second section adjacent the first section, said second section being perforated and formed integral with a chamber mounted below it, a third section adjacent the second section, said third section being perforated and formed integral with a chamber mounted below it, means to produce a vacuum in the chamber below the second section of the platform, means to produce a positive pressure in the chamber below the third section of the platform, a mixing chamber for slurry mounted above said casing, a conduit connecting said mixing chamber with the first section of said platform, an exit port for spent meal located in said casing, and a series of contiguous receptacles having bottoms formed of a porous material constituting a continuous belt conveyor, said conveyor being arranged so as to travel in close proximity to the upper surface of the fixed platform.

2. Apparatus for extracting oils from vegetable matter and comprising in combination an enclosing casing, a plurality of fixed contiguous chambers disposed in series within said casing, the top surfaces of said chambers lying in one plane parallel to the top surface of the casing, a solid top on the first and fourth chambers of the series, entry pipes for slurry and extraction solvent located in said casing above the first and fourth chambers of the series respectively, a perforated top on the second and fifth chambers of the series, means to produce a vacuum in the second and fifth chambers of the series, a perforated top on the third and sixth chambers of the series, means to produce a positive pressure in the third and sixth chambers of the series, an exit for spent meal located in said casing, and a series of contiguous receptacles having bottoms formed by a porous material constituting a continuous conveyor belt arranged so as to travel in close proximity to the top surface of said chamber.

3. Apparatus for extracting oils from vegetable matter and comprising in combination an enclosing casing, a plurality of fixed contiguous chambers disposed in series within said casing, the top surfaces of said chambers lying in one plane parallel to the top surface of the casing, a solid top on the first and fourth chambers of the series, entry pipes for slurry and attraction solvent located in said casing above the first and fourth chambers of the series respectively, a perforated top on the second and fifth chambers of the series, means to produce a vacuum in the second and fifth chambers of the series, a perforated top on the third and sixth chambers of the series, means to produce a positive pressure in the third and sixth chambers of the series, an exit for spent meal located in said casing, a continuous belt conveyor made of porous material, and being of substantially the same width as that of the enclosing casing, arranged so as to travel in close proximity to the top surfaces of said chambers, and a plurality of upstanding division plates secured to the continuous belt conveyor, said division plates being of substantially the same width as the conveyor belt and of a height substantially equal to the distance between the top surface of the chambers and the top surface of the casing.

References Cited in the file of this patent

UNITED STATES PATENTS

| | | |
|---|---|---|
| 307,707 | Byerley | Nov. 4, 1884 |
| 654,170 | Malard | July 24, 1900 |
| 813,078 | Bernhardt | Feb. 20, 1906 |
| 899,339 | Shuman | Sept. 22, 1908 |
| 1,840,149 | Bleil | Jan. 5, 1932 |

FOREIGN PATENTS

| | | |
|---|---|---|
| 278,145 | Great Britain | Oct. 6, 1927 |